Sept. 11, 1951  W. N. HEDEMAN ET AL  2,567,376
LIQUID STRAINER
Filed Dec. 19, 1947

Inventors
William Norman Hedeman
Clarence L. Stone

By Charles F. Kaegebehn
Attorney

Patented Sept. 11, 1951

2,567,376

UNITED STATES PATENT OFFICE 2,567,376

LIQUID STRAINER

William Norman Hedeman and Clarence L. Stone, Cincinnati, Ohio, assignors to National Lead Company, New York, N. Y., a corporation of New Jersey Application December 19, 1947, Serial No. 792,644

1 Claim. (Cl. 210—166)

The invention relates to an improved fluid strainer for installation in valves or the like, as circumferentially about the valve and port controlled thereby to withhold sediment from entry into the controlled port.

The strainer primarily is incorporated in valves of the character commercially designated as terminal check valves, used in force feed lubricator systems particularly as applied to steam locomotives and surroundingly about the valve, carried by a diaphragm, and its controlling port. The diaphragm is exposed to and actuated for valve operation by the pressure of the fluid lubricant supplied to a chamber into which the valve extends and against which the head end of the strainer bears in surrounding the valve and the port for controlling the discharge of the lubricant from the chamber. The strainer in its bearing engagement against the diaphragm is of a character non-influencing or retarding to the flexing or yielding action of the diaphragm.

An object of the invention is to provide a strainer for housing or surrounding a valve and its controlling port of spirally wound wire or coil structure to percolate a fluid, as oil therethrough and withholding the passage of sediment, simple and inexpensive in manufacture, readily installed and removed from within the body of the valve and applicable within a valve in service, as no change or alteration is required to the valve structure.

Another object is to provide a strainer of coiled wire, readily insertible within a valve chamber to encircle a diaphragm carried and operated valve and its port controlling seat and adapting its head end to bear against the diaphragm without influencing or retarding the action of the diaphragm.

Another object is to provide a strainer of cylindrical form produced by a strand of wire spirally close coiled for a determined cylinder length adapted to be seated within a chamber about a port in communication with the chamber to percolate and strain fluid in said chamber before discharge through said port.

Various other features and advantages of the invention will be more fully set forth in the following description of the accompanying drawings, depicting a preferred embodiment and forming a part hereof, in which.

Figure 1:
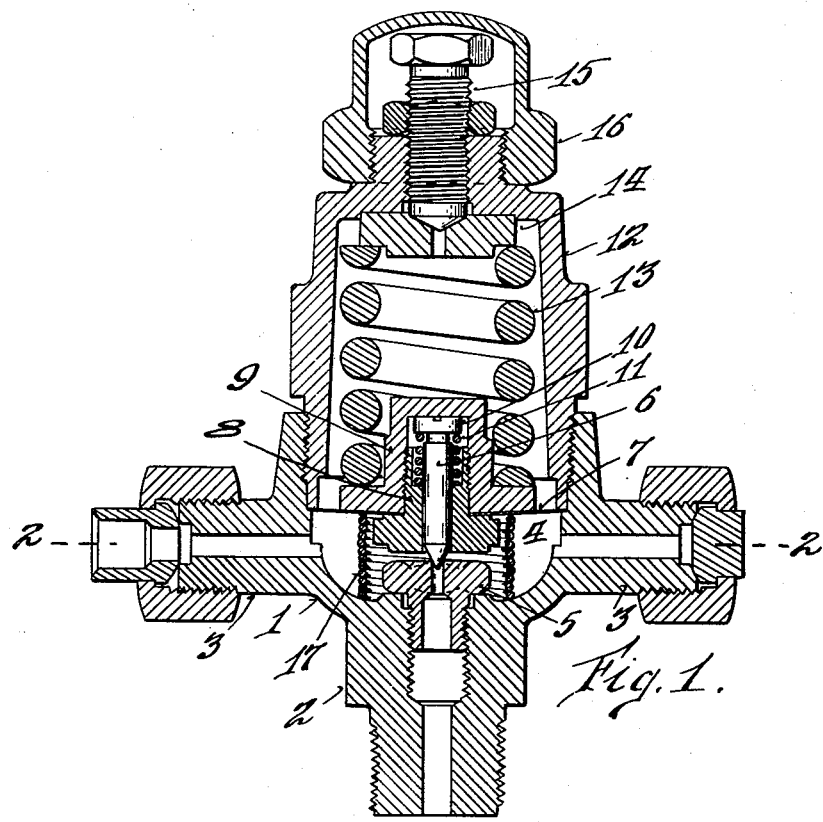
Figure 1 is a central vertical section through a diaphragm terminal valve employed in force feed lubricating systems, with the improved strainer disposed between the base of the chamber and valve sustaining and actuating diaphragm, enveloping the valve and its seat.
Figure 2:
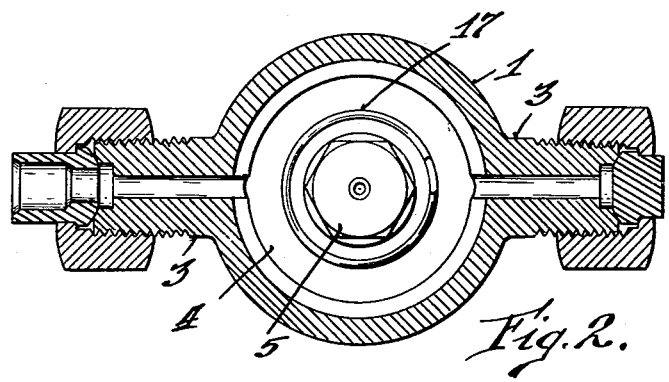
Figure 2 is a section on line 2—2, Figure 1.

The installation of the strainer or percolator within a diaphragm terminal valve is selective in that its structural characteristics possess functional advantages not necessarily involved in other types of valves, devices or appliances in which it may be employed.

The diaphragm terminal valve may be of conventional design and as illustrative is representative of that disclosed in U. S. Letters Patent No. 1,914,325, which in general provides a pin or needle valve, as the element which controls the discharge of oil from a chamber through a relatively small port or passage and fixed to a diaphragm which is exposed to the oil pressure in the chamber for actuating the valve and against the pressure of a spring or other pressure applied upon the opposite or outer side of the diaphragm for holding the needle valve seated until the pressure in the chamber rises to a determined degree. The needle valve when seated exposes a comparatively small area to the pressure in the chamber which is negligible toward influencing the operation of the valve, and as the strainer encircles the valve and bears against the diaphragm it is of a character non-influencing or retarding to the movements of the diaphragm.

Referring to the drawings, 1 indicates the valve body, having a nipple 2, integral therewith and extending centrally from the lower side or base of the body, with its outer end externally screw threaded for making a conduit coupling connection therewith. The nipple has a passage therethrough for communication with a chamber interior of the body and primarily provides for a controlled oil or fluid discharge from the chamber.

The body is also shown as provided with a pair of nipples, 3, 3, diametrically disposed and extending radially therefrom for making conduit coupling connections for the lubricant supply to the valve member 4, one of which is illustrated as sealed.

The discharge passage is counterbored and threaded for the reception of a removable and hardened valve seat thimble 5, having its head interior of and exposed to the chamber for cooperation with a tapering pointed pin or needle valve 6.

The valve 6, is slidably connected with a diaphragm 7, annularly marginally seated within the body upon an annular shoulder therein. The diaphragm provides a head sealing closure for the chamber and therefore is exposed to the pressure within the chamber to flex outwardly to actuate and unseat the valve. The valve traverses the diaphragm and slidably through an annularly flanged bushing which bears against the under or chamber exposed side of the diaphragm as a clamping element. The bushing engages into a central bore of a follower 9, and in threaded connection therewith. The follower is disposed upon the outer side of the diaphragm and in bearing connection therewith as a clamping element opposing to the flange of the bushing 8, for connecting the valve to the diaphragm.

The outer end of the needle valve 6, has a flanged head 10, in bearing contact or engagement with the follower into which it is extended and the underside of the head bears against an end of a spring 11, encircling the shank of the valve and seated within the outer end of the bushing 8, for compressing the valve against the follower for a yielding connection therewith to overbalance pressure on the valve, so the valve will raise in response to the slightest or minute movement of the diaphragm.

The diaphragm is marginally clamped within the body and against the shoulder therein by a bonnet 12, screw threaded into the head end of the body. The bonnet 12, provides a housing and abutment for a spring 13, concentric with the follower with one end in bearing contact with the annular flange of the follower. The opposite end of the spring 13, is nested upon a washer 14, within the head end of the bonnet and axially engaged by a screw 15, threaded through the head end of the bonnet for regulating the tension of the spring, to apply a determined pressure against the diaphragm, resistant to the pressure within the chamber, controlling the flexing of the diaphragm for opening or unseating the valve. The head end of the spring tension regulating screw 15, is external of the bonnet and enclosed by a cap 16, screw threaded upon the head end of the bonnet.

The valve chamber 4, is partitioned by a cylindrical strainer 17, concentrically about the needle valve 6, and the head of the bushing 8, with which the valve cooperates, and the lower end of the strainer is stationed upon the base of the chamber with its opposite end in bearing contact with the underside of the diaphragm 7. The strainer as shown consists of a strand of wire spirally coiled approximately in a closed coil degree and having but a slight spring yield or elasticity, merely sufficient to bear against the diaphragm for its alternate range of flex and ineffective in retarding or influencing diaphragm action. The oil or liquid in the chamber readily percolates through the spacing between the coils or convolutions, which are wound to a pitch, governed by the viscosity of the oil or filtering requirements. As the oil is introduced into the chamber under pressure or its pressure increased in the chamber, the coils of the strainer may be substantially in contact. The spiral coiling provides a continuous interstice for the cylinder length, therefore is superior to any foraminous or mesh type of screen, which it has been experienced cannot successfully be embodied in a diaphragm valve for if in contact with the diaphragm tends to be obstructive or interfering to the action of the diaphragm. The wire or strand may be of various designs and structure. The cylindrical coil form of strainer is simple and inexpensive in production, readily installed within or removed from the valve while coupled in service, by removal of the bonnet and diaphragm and no alteration to the structure of the valve is required. Cleansing of the strainer when it is removed from the valve can be readily accomplished by slushing the same within a liquid cleanser.

While the cylindrical form is preferable for the diaphragm type of valve as herein disclosed, it is recognized that its design can be readily modified for other installations and uses.

Having described our invention, we claim:

In a terminal valve of the nature disclosed, a valve casing having a chamber with inlet and discharge passages, a diaphragm marginally clamped within said casing and flexed by pressure in said chamber, a valve carried by said diaphragm for opening and closing said discharge passage in relative alternate flexing movements of the diaphragm governed by the rise and relief of pressure within said chamber and a close coiled spring strainer within said chamber encircling the valve and the valve controlled port of discharge passage and disposed between and axially in end bearing contact respectively with said diaphragm and a wall of said chamber said coiled spring strainer being under compression so that bearing contact is maintained between the ends of said strainer and said diaphragm and said wall of said chamber during flexing of said diaphragm.

WILLIAM NORMAN HEDEMAN.
CLARENCE L. STONE.

REFERENCES CITED

The following references are of record in the file of this patent:

UNITED STATES PATENTS

| Number | Name | Date |
| --- | --- | --- |
| 408,487 | Jewell | Aug. 6, 1889 |
| 559,440 | Conrader | May 5, 1896 |
| 759,144 | Walsh | May 3, 1904 |
| 765,182 | King | July 19, 1904 |
| 769,966 | Warner | Sept. 13, 1904 |
| 834,991 | McElroy | Nov. 6, 1906 |
| 840,992 | Cohn | Jan. 8, 1907 |
| 883,337 | Peck | Mar. 31, 1908 |
| 1,150,910 | Warmington | Aug. 24, 1915 |
| 1,314,566 | Bogda | Sept. 2, 1919 |
| 1,592,835 | Mock et al. | July 20, 1926 |
| 1,863,103 | Downs | June 14, 1932 |
| 1,903,248 | Spence | Mar. 28, 1933 |
| 1,914,325 | Corey | June 13, 1933 |
| 2,067,229 | Birch | Jan. 12, 1937 |
| 2,143,229 | Russel | Jan. 10, 1939 |
| 2,294,330 | Clark | Aug. 25, 1942 |
| 2,352,315 | Gilbert | June 27, 1944 |
| 2,383,672 | Neisingh | Aug. 28, 1945 |

FOREIGN PATENTS

| Number | Country | Date |
| --- | --- | --- |
| 122,398 | Great Britain | of 1919 |
| 126,586 | Great Britain | of 1919 |
| 507,459 | France | of 1920 |
| 36,002 | France | of 1929 |